United States Patent
Perez

(10) Patent No.: US 10,412,177 B2
(45) Date of Patent: Sep. 10, 2019

(54) METHOD AND SYSTEM OF USING IPV6 NEIGHBOR DISCOVERY OPTIONS FOR SERVICE DISCOVERY

(71) Applicant: Konica Minolta Laboratory U.S.A., Inc., San Mateo, CA (US)

(72) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 274 days.

(21) Appl. No.: 15/084,994

(22) Filed: Mar. 30, 2016

(65) Prior Publication Data

US 2017/0289273 A1    Oct. 5, 2017

(51) Int. Cl.
*H04L 29/08* (2006.01)
*H04L 29/12* (2006.01)

(52) U.S. Cl.
CPC .......... *H04L 67/16* (2013.01); *H04L 61/6059* (2013.01)

(58) Field of Classification Search
CPC ............................ H04L 67/16; H04L 61/6059
See application file for complete search history.

(56) References Cited

U.S. PATENT DOCUMENTS

| | | | | |
|---|---|---|---|---|
| 8,576,857 B2 * | 11/2013 | Singh | .................. | H04L 41/0816 370/401 |
| 8,626,912 B1 * | 1/2014 | Rothstein | ................ | H04L 43/18 370/235 |
| 8,893,271 B1 * | 11/2014 | Sharma | ................ | H04L 63/0236 726/22 |
| 9,917,905 B2 * | 3/2018 | Amishav | ............. | H04L 41/5058 |
| 2004/0111529 A1 * | 6/2004 | Parmar | ................... | H04L 29/06 709/245 |
| 2004/0267876 A1 * | 12/2004 | Kakivaya | ................ | H04L 67/16 709/200 |
| 2006/0069807 A1 * | 3/2006 | Tagawa | ............ | H04L 29/12009 709/245 |
| 2006/0190717 A1 * | 8/2006 | Ohhira | .............. | H04L 29/12113 713/153 |
| 2006/0253610 A1 * | 11/2006 | Yamada | ................. | H04L 67/16 709/245 |
| 2007/0047549 A1 * | 3/2007 | Park | ........................ | H04L 29/06 370/392 |

(Continued)

*Primary Examiner* — Blake J Rubin
(74) *Attorney, Agent, or Firm* — Buchanan Ingersoll & Rooney PC

(57) ABSTRACT

A method is disclosed of using IPv6 Neighbor Discovery to discover application services in an IPv6 network, the method including hosting a list of application services on a first host device; creating an application service Neighbor Discovery option for the list of application services hosted on the first host device; attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to one or more second host devices on a IPv6 network connection, wherein the application service Neighbor Discovery option provides the one or more second host devices with the list of application services hosted on the first host device.

20 Claims, 3 Drawing Sheets

(56) References Cited

U.S. PATENT DOCUMENTS

| | | | |
|---|---|---|---|
| 2007/0061455 A1* | 3/2007 | Callaghan | H04L 63/08 709/225 |
| 2007/0171881 A1* | 7/2007 | Zhang | H04W 48/16 370/338 |
| 2007/0192858 A1* | 8/2007 | Lum | H04L 29/12028 726/22 |
| 2007/0198671 A1* | 8/2007 | Motoyama | G08C 17/02 709/222 |
| 2007/0245033 A1* | 10/2007 | Gavrilescu | H04L 29/12801 709/230 |
| 2008/0183905 A1* | 7/2008 | Kitada | G06F 9/44552 710/8 |
| 2008/0313343 A1* | 12/2008 | Aikawa | H04L 69/16 709/230 |
| 2009/0052347 A1* | 2/2009 | Kim | H04L 29/1232 370/254 |
| 2009/0323688 A1* | 12/2009 | Torii | H04L 12/18 370/390 |
| 2010/0202018 A1* | 8/2010 | Akiyama | G03G 15/5004 358/1.15 |
| 2010/0229030 A1* | 9/2010 | Shouno | H04L 29/12273 714/5.1 |
| 2010/0325257 A1* | 12/2010 | Goel | H04L 29/12028 709/223 |
| 2011/0055362 A1* | 3/2011 | Perez | H04L 63/02 709/221 |
| 2011/0064076 A1* | 3/2011 | Matsuo | H04L 29/12066 370/389 |
| 2011/0161665 A1* | 6/2011 | Perez | H04L 29/12028 713/161 |
| 2011/0222102 A1* | 9/2011 | Ito | H04N 1/00204 358/1.14 |
| 2012/0047241 A1* | 2/2012 | Hozumi | H04L 41/0213 709/223 |
| 2012/0084568 A1* | 4/2012 | Sarikaya | H04L 9/3066 713/176 |
| 2012/0201245 A1* | 8/2012 | Ogata | H04L 12/1886 370/390 |
| 2012/0314624 A1* | 12/2012 | Asati | H04L 61/1511 370/257 |
| 2013/0138796 A1* | 5/2013 | Nicholson | H04L 67/16 709/224 |
| 2014/0002247 A1* | 1/2014 | Harrison | H04L 63/10 340/12.5 |
| 2014/0282864 A1* | 9/2014 | Thubert | H04L 63/1458 726/3 |
| 2014/0334334 A1* | 11/2014 | Brzozowski | H04L 41/0873 370/254 |
| 2015/0097457 A1* | 4/2015 | Kummlee | F16C 39/02 310/90.5 |
| 2015/0098457 A1* | 4/2015 | Mahendran | H04W 76/10 370/338 |
| 2016/0026416 A1* | 1/2016 | Kikuchi | G06F 3/1226 358/1.15 |
| 2016/0036762 A1* | 2/2016 | Droms | H04L 61/1511 709/224 |
| 2017/0126569 A1* | 5/2017 | Seed | H04W 4/70 |
| 2017/0127370 A1* | 5/2017 | Wang | H04W 4/70 |
| 2017/0353560 A1* | 12/2017 | Qi | H04L 67/16 |
| 2018/0191666 A1* | 7/2018 | Rahman | H04L 67/16 |

* cited by examiner

METHOD AND SYSTEM OF USING IPV6 NEIGHBOR DISCOVERY OPTIONS FOR SERVICE DISCOVERY

FIELD OF THE INVENTION

The present invention relates to a method and system of using IPv6 Neighbor Discovery Options for application service discovery, and more particularly to a software module or software application associated with a host or client device, such as a personal computer or an image forming apparatus, which uses IPv6 Neighbor Discovery options for discovery of, for example, application services to users over an IPv6 network.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e., Neighbor Discovery Protocol or NDP).

When first connected to a network, an IPv6 host (or node) sends a link-local multicast neighbor solicitation request advertising its tentative link-local address for double address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

SUMMARY OF THE INVENTION

With the implementation of IPv6 networks, it would be desirable to have a software module or software application associated with a host or client device, such as a personal computer or an image forming apparatus, which uses IPv6 Neighbor Discovery options for discovery of, for example, application services to users over an IPv6 network. In accordance with an exemplary embodiment, for example, the service information can be stored or embedded in a Neighbor Discovery Option, which other IPv6 neighbors can use to advertise and/or discover services in the IPv6 network.

A method is disclosed of using IPv6 Neighbor Discovery to discover application services in an IPv6 network, the method comprising: hosting a list of application services on a first host device; creating an application service Neighbor Discovery option for the list of application services hosted on the first host device; attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to one or more second host devices on a IPv6 network connection, wherein the application service Neighbor Discovery option provides the one or more second host devices with the list of application services hosted on the first host device.

A computer program product comprising a non-transitory computer usable medium having a computer readable code embodied therein is disclosed, which uses IPv6 Neighbor Discovery to discover application services in an IPv6 network, the process comprising: hosting a list of application services on a first host device; creating an application service Neighbor Discovery option for the list of application services hosted on the first host device; attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to one or more second host devices on a IPv6 network connection, wherein the application service Neighbor Discovery option provides the one or more second host devices with the list of application services hosted on the first host device.

A system is disclosed, which uses IPv6 Neighbor Discovery to discover application services in an IPv6 network, the system comprising: a first host device configured to: host a list of application services; create an application service Neighbor Discovery option for the list of application services hosted on the first host device; attach the application service Neighbor Discovery option to a Neighbor Discovery solicitation response, a Neighbor Discovery advertisement, or a Neighbor Discovery solicitation request; and send the Neighbor Discovery solicitation response, the Neighbor Discovery advertisement, or the Neighbor Discovery solicitation request with the application service Neighbor Discovery option from the first host device to one or more second host devices on a IPv6 network connection, wherein the application service Neighbor Discovery option provides the one or more second host devices with the list of application services hosted on the first host device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
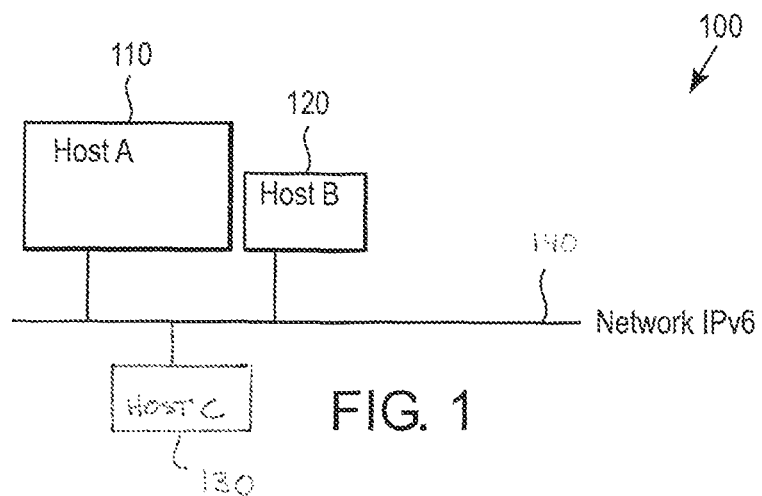
FIG. 1 is an illustration of a network system with a network communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

A method and system are disclosed, which can discover different application services using optional neighbor discovery options in IPv6. In accordance with an exemplary embodiment, since IPv6 neighbor discovery is conducted relatively early in the network initialization process, it would be desirable if during the IPv6 neighbor discovery, access to application services information is provided. Thus, for example, if a protocol requires the discovery of an application service, the protocol could obtain the application information as early as possible, and additionally service discovery could be avoided for the services discovered through this feature.

In accordance with an exemplary embodiment, different types of application discovery services could be implemented by the method and system as disclosed herein. For example, application services can include computer-based services provided over the IPv6 network such as access to particular software applications for business applications and web services, including, for example, a copy function ("copy"), an image reading function ("scan"), a facsimile function ("fax"), a printer function (print), office and messaging software, payroll processing software, database management software, management software, CAD software, development software, accounting, collaboration, customer relationship management, management information systems (MIS), enterprise resource planning, invoicing, human resource management (HRM), and antivirus software.

In accordance with an exemplary embodiment, by employing a software application or software module using Neighbor Discovery, for example, the system and method as disclosed herein can continuously run in a network such that available application services can be continuously updated and provided to host and/or client devices, or alternatively, a host or client device can broadcast available application services. In accordance with an exemplary embodiment, for example, a software application or software module hosted by a host device can compile a list of available application services including information relating to different types of services provided by a host device, and the information can placed or inserted inside an optional Neighbor Discovery option. Thus, rather than using a service discovery protocol to detect devices and services offered by these devices on the network, the method and system of service discovery as disclosed herein using the IPv6 Neighbor Discovery would be more expedient and convenient.

Service discovery network protocols (SDP) allow the automatic detection of services offered by devices. In accordance with an exemplary embodiment, rather than a service discovery protocol, the services (or information) offered by a host device could be provided in the IPv6 Neighbor Discovery Options. Thus, a device that requests such information and a device that provides the information can interchange the information earlier than usual and do it without requiring extra packets since the information can be exchanged using the available Neighbor Discovery options transport. In addition, since a host device using IPv6 Neighbor Discovery refreshes its caches frequently, if there are any changes in the service availability, the corresponding changes can be detected, for example, as frequently as Neighbor Discover timing allows. For example, in accordance with an exemplary embodiment, updating the list of application services hosted on a first host or client device can be based on, for example, Neighbor Discovery timing rules.

FIG. 1 shows a network system 100 having a communication protocol, which includes a first host device (node A) 110 in the form of, for example, a personal computer, a printer, or multi-function peripheral (MFP), a second host device (node B) 120, for example, an IPv6 router or a DHCPv6 server, and a third host device 130, for example, a printer or a multi-function peripheral. In accordance with an exemplary embodiment, the first host device (node A) 110, the second host device (node B) 120, and the third host device 130 (node C) are connected to each other through an IPv6 communication network 140 in a state capable of performing data communications.

In accordance with an exemplary embodiment, the host devices (or nodes A, B, C) 110, 120, 130 can be network devices, which support an IPv6 communication protocol (Internet Protocol version 6). Examples of communication networks 140 consistent with embodiments of the invention include, but are not limited to, the Internet, an Intranet, a local area network (LAN) and a wide area network (WAN). The first host device (or node A) 110, the second host device (node B) 120, and the third host device 130 (node C) can be connected with a wire, or can be connected with a wireless connection by using radio frequency (RF), infrared (IR) transmission, USB, IEEE1394 and/or other suitable wireless technology.

In accordance with an exemplary embodiment, for example, the second host device (node B) 120 may be embodied, for example, by a neighbor, a router, a DHCPv6 server (Dynamic Host Configuration Protocol version 6 server). In accordance with an exemplary embodiment, the third host device (node C) 130 can be a multi-function peripheral (MFP), which includes at least a copy function, an image reading function, a facsimile (fax) function, and a printer function, and forms an image on a sheet based on a print job (print instruction) received, from the first host device (or node A) 110 from, for example, a client device in the form of a personal computer.

In accordance with another exemplary embodiment, the first host device (or node A) 110, which may be embodied by a computer system, and generates the printing data usable in a printer or multi-function peripheral (MFP) 130 and transmits the generated printing data to the MFP 130. An example of the one or first host device (or node A) 110 may include a computer and/or a portable device such as a notebook personal computer, a cellular phone and a personal digital assistant (PDA). The first host device (or node A) 110 can be a personal computers, and has the function of sending a print job to the third host device (node C) 130.

In accordance with an exemplary embodiment, the first, the second, and the third host devices (or nodes A, B, and C) 110, 120, 130 can constitute an image forming system to install a communication port, to generate printing data, and to perform a printing operation of forming an image on a printing medium according to the printing data. A printer driver program (hereinafter, sometimes simply referred to as a printer driver) can be installed in the first host device 110, and the first host device 110 uses the function of the printer driver to generate a print job including the data of print conditions to be applied at the time of image formation, and image data, and sends the generated print job to the third host device 130.

In the IPv6 protocol, the generation of an IP address (or IPv6 address) for an image forming device or other apparatus/device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from an underlying data link layer address (or MAC ID). The IPv6 protocol provides a computer device or image forming apparatus the ability to generate a temporary address until it can determine the characteristics of the network, and then create a permanent address it can use based on that information.

In accordance with an exemplary embodiment, the steps a host device or image forming apparatus takes when using stateless autoconfiguration is configured to generate a link-local address, which is one of the two types of local-use IPv6 addresses. The link-local addresses has "1111 1110 10" for the first ten bits. The generated address uses those ten bits followed by 54 zeroes and then the 64-bit interface identifier, for example, which can be derived from the data link layer (MAC) address.

A Link-Local Address Uniqueness Test (or Double address detection (DAD)) can be used to test and to ensure that the address it generated is not for some reason already in use on the local network. The device or apparatus sends a Neighbor Solicitation message using the Neighbor Discovery (ND) protocol, and listens for a Neighbor Advertisement in response that indicates that another device is already using its link-local address, and if so, either a new address must be generated, or autoconfiguration fails and another method must be employed.

Assuming the uniqueness test passes, the host device assigns the link-local address (i.e., Link-Local Address Assignment) to its IP interface. This address can be used for communication on the local network, however, it cannot be used on the wider Internet (or communication network), since link-local addresses are not routed.

The node next attempts to contact a local router for more information on continuing the configuration. This can be done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Assuming that stateless autoconfiguration is in use on the network, the host will configure itself with its globally-unique Internet address. It can be appreciated that this globally-unique address is generally formed from a network prefix provided to the host by the router, combined with the device's identifier as generated in the first step. In addition, when using the protocol stateless addressing (stateless autoconfiguration) for IPv6, which is required by the IPv6 Ready Logo Program, the link-local addresses and global addresses are determined by concatenating an identifier unique to the adapter. Thus, when a MAC address broadcast is sent out, each network interface card on the local area network will see the broadcast address and automatically pass the information up to the upper layers of the OSI model (Open Systems Interconnection model).

Figure 2:
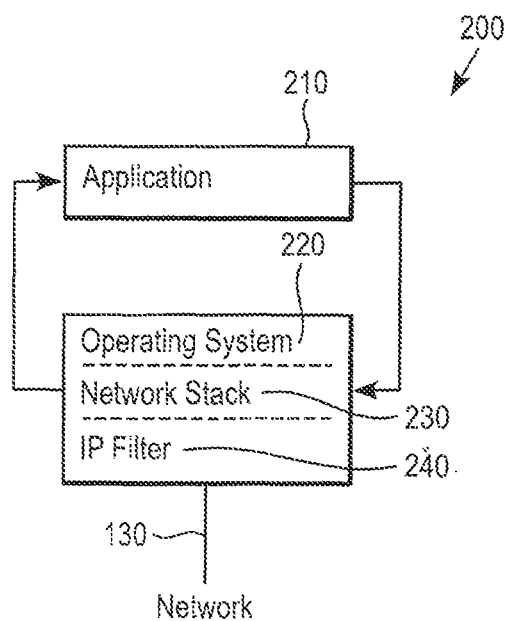
FIG. 2 is an illustration of a network stack for a host device (or node) having an application for filtering data packets in accordance with an exemplary embodiment.

FIG. 2 is an illustration of a network stack for a host device (or node) 200 having an application 210 for filtering data packets in accordance with an exemplary embodiment. As shown in FIG. 2, the host device 200 has a software module (or application) 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the software module 210 is preferably an application level module, which is configured to modify, drop, change, and judge Neighbor Discovery generated packages (i.e., Neighbor Discovery solicitation or Neighbor Discovery advertisement packets) as described herein. In accordance with an exemplary embodiment, the software module 210 can be part of the printer driver and/or firmware of a host device, such as a personal computer, Multi-Function printer, router, and/or a DHCPv6 server, or a separate software module or application, or part to the operating system of the host device 200.

In accordance with an exemplary embodiment, the IP filter 240 forwards the incoming or outgoing packet having a Neighbor Discovery solicitation or Neighbor Discovery advertisement packet (or package) to the software module 210, which in combination with the socket layer modifies, changes, drops and/or judges the Neighbor Discovery generated packages as described herein. Each of the host devices (or nodes A, B, C) 110, 120, 130 preferably includes a software module (or application) 210, which can perform at least a portion and/or more preferably all of the steps necessary to set and/or decrypt the GPS location and security options as described herein.

The packets (or packages) are preferably broadcast and/or sent out via a communication network, for example, an IPv6 network 140. In accordance with an exemplary embodiment, the IP filter 240 preferably captures the IPv6 packet before the initial broadcast (i.e., Neighbor Discovery) and/or alternatively, before the packet is sent to the Network Stack 230 for processing. In accordance with an exemplary embodiment, the software module's 210 functionality also can be enabled or disabled at will by a network administrator or other designated individual.

The host device (or node) 200 can include an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the host device 110, 120, 130 (or nodes A, B, or C), and the network layer is under or a part of the operating system 220. It can be appreciated that by utilizing a software module 210 as described herein, the operating system of the host device 200 does not need to be altered or changed in anyway.

Alternatively, it can be appreciated that in accordance with another exemplary embodiment, the operating system (OS) 220 can be configured to perform the methods as described herein. The examples as set forth herein are exemplary only, and as such, additional security options, which use IPv6 Neighbor Discovery messages, can be implemented without departing from the present disclosure.

Figure 3:
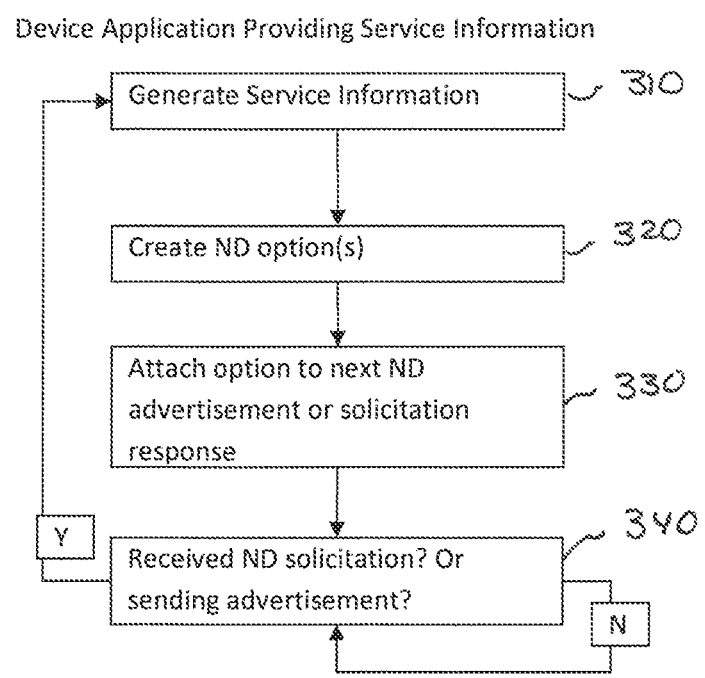
FIG. 3 is a flow chart illustrating a host or client device having a software module or software application providing service information in accordance with an exemplary embodiment.

FIG. 3 is a flow chart illustrating a host or client device 110, 120, 130 having a software application or software module 210 providing application service information in accordance with an exemplary embodiment. In accordance with an exemplary embodiment, as shown in FIG. 3, in step 310, a client or host device 110, 120, 130 having, for example, a device application (or software module) 210 generates service information to be broadcast in a Neighbor Discovery advertisement or solicitation response. The generating of the service information can include, for example, generating a table or list of available application services and hosting the table or list of available application services on the client or host device 110. As set forth above, the service information can include information relating to access to particular software applications, for example, for businesses, web services, and/or application hosted on devices, such as multi-function peripherals (MFPs).

In step 320, the device application 210 creates one or more Neighbor Discovery option(s) to be attached to a next Neighbor Discovery advertisement or solicitation response. In step 330, the device application 210 attaches at least one of the option(s) to the next Neighbor Discovery advertisement or solicitation response. For example, in accordance with an exemplary embodiment, the solicitation response can include a specific request for available application services on the client or host device 110.

In step 340, if a Neighbor Discovery solicitation is received by the device application 210 requesting available application services, the process return to step 310, wherein the service information can be generated and the process proceeds as disclosed above. Alternatively, if the device application 210 is sending a Neighbor Discovery advertisement, the one or more Neighbor Discovery option(s) can be sent by the host or client device 110 with the Neighbor Discovery advertisement to a second or client device 120.

In accordance with an exemplary embodiment, an exemplary example of a discovery service record can be as follows:
  (_ipps._tcp)
  Service type=myservice._tcp
  Service name=print @ printer
  Hostname=myhostname
  Domain=local.
  Address=fe80::d69a:34ff:fe98:3456
  Address=2048:4569::34ff:fe98:3456

Figure 4:
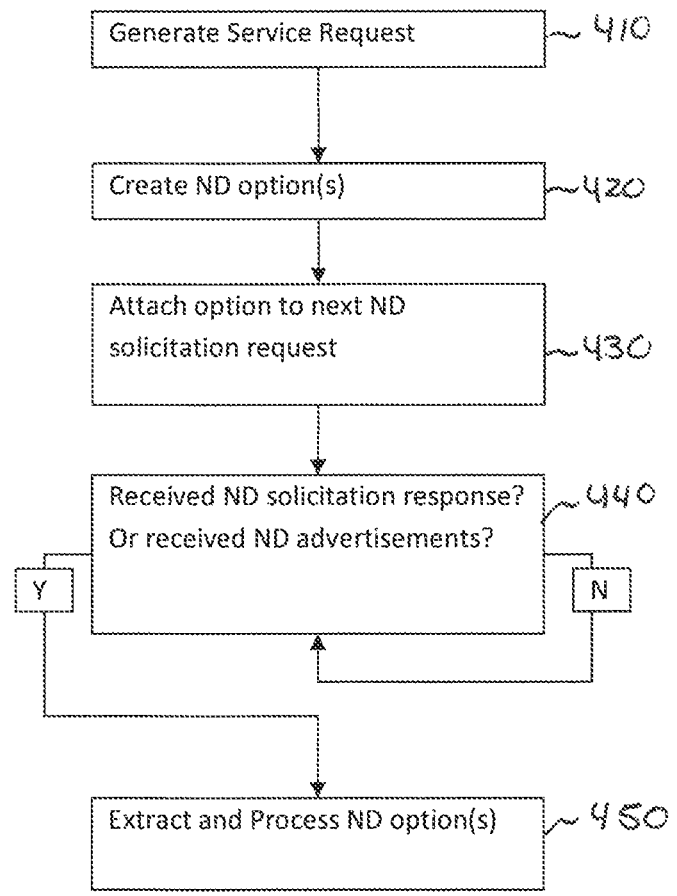
FIG. 4 is a flow chart illustrating a host or client device having a software module or software application requesting service information in accordance with an exemplary embodiment.

FIG. 4 is a flow chart illustrating a device application (or software module) 210 requesting service information in accordance with an exemplary embodiment. In accordance with an exemplary embodiment, the device application (or software module) 210, for example, on a second host or client device 120, 130 can send a Neighbor Discovery solicitation request to the first host or client device 110 requesting the discovery of service information hosted by the first host or client device 110.

As shown in FIG. 4, in step 410, the second host or client device 120 can generate a request for service information. In accordance with an exemplary embodiment, in step 420, the device application 210 creates a Neighbor Discovery option with the service information requested to be attached to the next Neighbor Discovery solicitation request. In step 430, the Neighbor Discovery option is attached to the next Neighbor Discovery solicitation request, which is broadcast to the first host or client device 110. In addition, the software application or software module 210 can also monitor for Neighbor Discovery advertisements to acquire service information in the options. In accordance with an exemplary embodiment, the Neighbor Discovery tables can frequently update the application such that changes in services in which the host or client device 110, 120 is interested can be as often as Neighbor Discovery timing allows.

As shown in FIG. 4, in step 440, if a Neighbor Discovery solicitation response or a Neighbor Discovery advertisement is received by the device application 210 with Neighbor Discover option(s), in step 450, the Neighbor Discovery option(s) can be extracted from the solicitation response and/or advertisement by the software application or module 201. If a Neighbor Discovery solicitation response or a Neighbor Discovery advertisement is not received, the process returns to step 440 until the response or advertisement is received.

In accordance with an exemplary embodiment, a computer program product comprising a non-transitory computer usable medium having a computer readable code embodied therein, which uses IPv6 Neighbor Discovery to discover application services in an IPv6 network, the process comprising: hosting a list of application services on a first host device; creating an application service Neighbor Discovery option for the list of application services hosted on the first host device; attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to one or more second host devices on a IPv6 network connection, wherein the application service Neighbor Discovery option provides the one or more second host devices with the list of application services hosted on the first host device.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of using IPv6 Neighbor Discovery to discover application services in an IPv6 network, the method comprising:
  hosting a list of application services on a first host device, the first host device being a multi-function peripheral (MFP), which includes at least one of a copy function, an image reading function, a facsimile (fax) function, or a printer function, the list of application services being a list of computer-based services, which are currently available to one or more second host devices over the IPv6 network, and wherein each application service on the list of application services is configured to be executed on the first host device;

creating an application service Neighbor Discovery option for the list of application services hosted on the first host device;

attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to the one or more second host devices on the IPv6 network, wherein the application service Neighbor Discovery option provides the one or more second host devices with the list of application services hosted on the first host device.

2. The method of claim 1, comprising:

receiving the Neighbor Discovery solicitation response, the Neighbor Discovery advertisement, or the Neighbor Discovery solicitation request with the application service Neighbor Discovery option on the one or more second host devices;

extracting the listing of application services from the application service Neighbor Discovery option from the Neighbor Discovery solicitation response, the Neighbor Discovery advertisement, or the Neighbor Discovery solicitation request on the one or more second host devices;

sending a request from at least one of the one or more second host devices for at least one of the application services hosted on the first host device; and delivering the at least one of the application services hosted on the first host device to the at least one of the one or more second host devices over the IPv6 network.

3. The method of claim 1, comprising:

creating the application service Neighbor Discovery option for the list of application services on a first software module on the first host device, the first software module configured to create and attach the application service Neighbor Discovery option to the Neighbor Discovery solicitation response, the Neighbor Discovery advertisement, or the Neighbor Discovery solicitation request.

4. The method of claim 1, comprising:

updating the list of application service hosted on the first host device using Neighbor Discovery timing rules.

5. The method of claim 1, comprising:

attaching the application service Neighbor Discovery option to a next Neighbor Discovery advertisement or a next Neighbor Discovery response; and sending the next Neighbor Discovery advertisement or the next Neighbor Discovery solicitation response with the application service Neighbor Discovery option to the one or more second host devices.

6. The method of claim 1, comprising:

generating a request for application services on one of the one or more second host devices;

sending the request for application services from the one of the one or more second host devices in the Neighbor Discovery solicitation request to the first host device;

receiving the request for application services from the one of the one or more second host devices in the Neighbor Discovery solicitation request on the first host device;

attaching the application service Neighbor Discovery option to a next Neighbor Discovery solicitation response on the first host device; and sending the next Neighbor Discovery solicitation response with the application service Neighbor Discovery option.

7. The method of claim 6, comprising:

capturing processing the Neighbor Discovery solicitation response with the application service Neighbor Discovery option via a second software module on the one of the one or more second hosts, wherein the second software module is configured to process the Neighbor Discovery solicitation response with the application service Neighbor Discovery option; and requesting the at least one of the application services hosted on the first host device.

8. The method of claim 1, wherein the list of application services hosted on the first host device is one or more of the following:

the copy function, the image reading function, the facsimile (fax) function, and the printer function.

9. The method of claim 8, comprising sending a print job to the MFP; and receiving the print job on the MFP and printing the print job.

10. A computer program product comprising a non-transitory computer usable medium having a computer readable code embodied therein, which uses IPv6 Neighbor Discovery to discover application services in an IPv6 network, the process comprising:

hosting a list of application services on a first host device, the first host device being a multi-function peripheral (MFP), which includes at least one of a copy function, an image reading function, a facsimile (fax) function, or a printer function, the list of application services being a list of computer-based services, which are currently available to one or more second host devices over the IPv6 network, and wherein each application service on the list of application services is configured to be executed on the first host device;

creating an application service Neighbor Discovery option for the list of application services hosted on the first host device;

attaching the application service Neighbor Discovery option to a Neighbor Discovery solicitation response, a Neighbor Discovery advertisement, or a Neighbor Discovery solicitation request; and sending the Neighbor Discovery solicitation response, the Neighbor Discovery advertisement, or the Neighbor Discovery solicitation request with the application service Neighbor Discovery option from the first host device to the one or more second host devices on the IPv6 network, wherein the application service Neighbor Discovery option provides the one or more second host devices with the list of application services hosted on the first host device.

11. The computer program product of claim 10, comprising:

receiving the Neighbor Discovery solicitation response, the Neighbor Discovery advertisement, or the Neighbor Discovery solicitation request with the application service Neighbor Discovery option on the one or more second host devices;

extracting the listing of application services from the application service Neighbor Discovery option from the Neighbor Discovery solicitation response, the Neighbor Discovery advertisement, or the Neighbor Discovery solicitation request on the one or more second host devices;

sending a request from at least one of the one or more second host devices for at least one of the application services hosted on the first host device; and delivering the at least one of the application services hosted on the first host device to the at least one of the one or more second host devices over the IPv6 network.

12. The computer program product of claim 10, comprising:

creating the application service Neighbor Discovery option for the list of application services on a first software module on the first host device, the first software module configured to create and attach the application service Neighbor Discovery option to the Neighbor Discovery solicitation response, the Neighbor Discovery advertisement, or the Neighbor Discovery solicitation request.

13. The computer program product of claim 10, comprising:

updating the list of application service hosted on the first host device using Neighbor Discovery timing rules.

14. The computer program product of claim 10, comprising:

attaching the application service Neighbor Discovery option to a next Neighbor Discovery advertisement or a next Neighbor Discovery response; and sending the next Neighbor Discovery advertisement or the next Neighbor Discovery solicitation response with the application service Neighbor Discovery option to the one or more second host devices.

15. The computer program product of claim 10, comprising:

generating a request for application services on one of the one or more second host devices;

sending the request for application services from the one of the one or more second host devices in the Neighbor Discovery solicitation request to the first host device;

receiving the request for application services from the one of the one or more second host devices in the Neighbor Discovery solicitation request on the first host device;

attaching the application service Neighbor Discovery option to a next Neighbor Discovery solicitation response on the first host device;

sending the next Neighbor Discovery solicitation response with the application service Neighbor Discovery option;

capturing processing the Neighbor Discovery solicitation response with the application service Neighbor Discovery option via a second software module on the one of the one or more second hosts, wherein the second software module is configured to process the Neighbor Discovery solicitation response with the application service Neighbor Discovery option; and requesting the at least one of the application services hosted on the first host device.

16. A system, which uses IPv6 Neighbor Discovery to discover application services in an IPv6 network, the system comprising:

a first host device, the first host device being a multi-function peripheral (MFP), which includes at least one of a copy function, an image reading function, a facsimile (fax) function, or a printer function, and wherein the first host device is configured to:

host a list of application services, the list of application services being a list of computer-based services, which are currently available to one or more second host devices over the IPv6 network, and wherein each application service on the list of application services is configured to be executed on the first host device;

create an application service Neighbor Discovery option for the list of application services hosted on the first host device;

attach the application service Neighbor Discovery option to a Neighbor Discovery solicitation response, a Neighbor Discovery advertisement, or a Neighbor Discovery solicitation request; and send the Neighbor Discovery solicitation response, the Neighbor Discovery advertisement, or the Neighbor Discovery solicitation request with the application service Neighbor Discovery option from the first host device to the one or more second host devices on the IPv6 network, wherein the application service Neighbor Discovery option provides the one or more second host devices with the list of application services hosted on the first host device.

17. The system of claim 16, comprising:

at least one second host device, wherein the at least one second host device is configured to:

receive the Neighbor Discovery solicitation response, the Neighbor Discovery advertisement, or the Neighbor Discovery solicitation request with the application service Neighbor Discovery option;

extract the listing of application services from the application service Neighbor Discovery option from the Neighbor Discovery solicitation response, the Neighbor Discovery advertisement, or the Neighbor Discovery solicitation request;

send a request from at least one second host device for at least one of the application services hosted on the first host device; and receive the at least one of the application services hosted on the first host device over the IPv6 network.

18. The system of claim 16, wherein the first host device is configured to:

attach the application service Neighbor Discovery option to a next Neighbor Discovery advertisement or a next Neighbor Discovery response; and send the next Neighbor Discovery advertisement or the next Neighbor Discovery solicitation response with the application service Neighbor Discovery option to the one or more second host devices.

19. The system of claim 16, wherein the first host device and the at least one second host device are configured to:

generate a request for application services on the at least one second host device;

send the request for application services from the at least one second host device in the Neighbor Discovery solicitation request to the first host device;

receive the request for application services from the at least one second host device in the Neighbor Discovery solicitation request on the first host device;

attach the application service Neighbor Discovery option to a next Neighbor Discovery solicitation response on the first host device;

send the next Neighbor Discovery solicitation response with the application service Neighbor Discovery option;

capture processing the Neighbor Discovery solicitation response with the application service Neighbor Discovery option via a software module on the at least one second host, wherein the second software module is configured to process the Neighbor Discovery solicitation response with the application service Neighbor Discovery option; and request the at least one of the application services hosted on the first host device.

20. The method of claim 1, wherein the list of application services being a list of computer-based services, which are available to one or more second host devices over the IPv6 network comprises one or more of the following:

software applications for business applications and web services, office and messaging software, payroll processing software, database management software, management software, computer-aided design (CAD) software, development software, and/or antivirus software.

* * * * *